United States Patent [19]

Büchler

[11] Patent Number: 4,577,846
[45] Date of Patent: Mar. 25, 1986

[54] DEVICE FOR MOUNTING AN OBJECT

[76] Inventor: René Büchler, Weidweg 2, CH-9245 Sonnental, Switzerland

[21] Appl. No.: 571,754

[22] Filed: Jan. 18, 1984

[30] Foreign Application Priority Data

Jan. 18, 1983 [GB] United Kingdom ............... 8301296

[51] Int. Cl.⁴ ............................................. B23Q 1/04
[52] U.S. Cl. ................................................... 269/82
[58] Field of Search ................... 308/3 A; 269/55, 56, 269/71, 73, 285, 82

[56] References Cited

U.S. PATENT DOCUMENTS 4,253,709  3/1981  Teramachi ........................... 308/3 A
4,300,271  11/1981  Wohlhaupter ...................... 308/3 A

FOREIGN PATENT DOCUMENTS 244288  12/1925  United Kingdom ............... 308/3 A Primary Examiner—Robert C. Watson
Attorney, Agent, or Firm—Wegner & Bretschneider

[57] ABSTRACT

The device comprises a guiding piece (1), the upper part of which is of profiled construction. The two lateral surfaces (14, 15) of the beam-shaped guiding piece (1) are provided in the region of its top corner parts with channels (17, 18). A guided piece (2), in the underside of which a groove (25) is executed, is positioned on the guiding piece (1). One of the lateral walls (30) of this groove (25) is undercut and is in engagement with the flank (19) of one of the channels (17) of the beam (1). The opposite lateral wall (32) of the groove (25) stands approximately at right angles to the bottom (33) of the groove (25). A cavity, in which a pawl (4) is located, is executed in this portion of the guided piece (2). This pawl (4) is connected by means of a screw (6) to the guided piece (2), a nose (35) of the pawl (4) engaging the other channel (18) of the beam (1). In such a device, the guided piece can be placed upon the guiding piece at any point of the latter. The position of the support surface for the workpiece can be finely adjusted and/or levelled. The contact surfaces between the guiding piece and the guided piece are constructed and dimensioned so that, after the guiding piece has been introduced into the guided piece, this structure cannot collapse under the influence of the deadweight of these parts, even if the pawl of the holding device has not been tightened.

23 Claims, 23 Drawing Figures

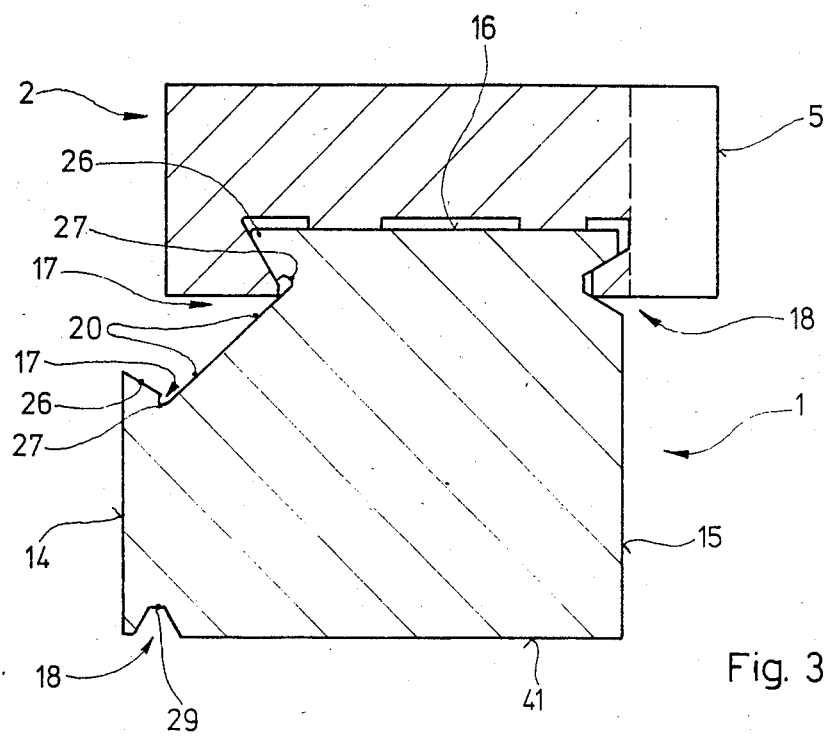
Fig. 3
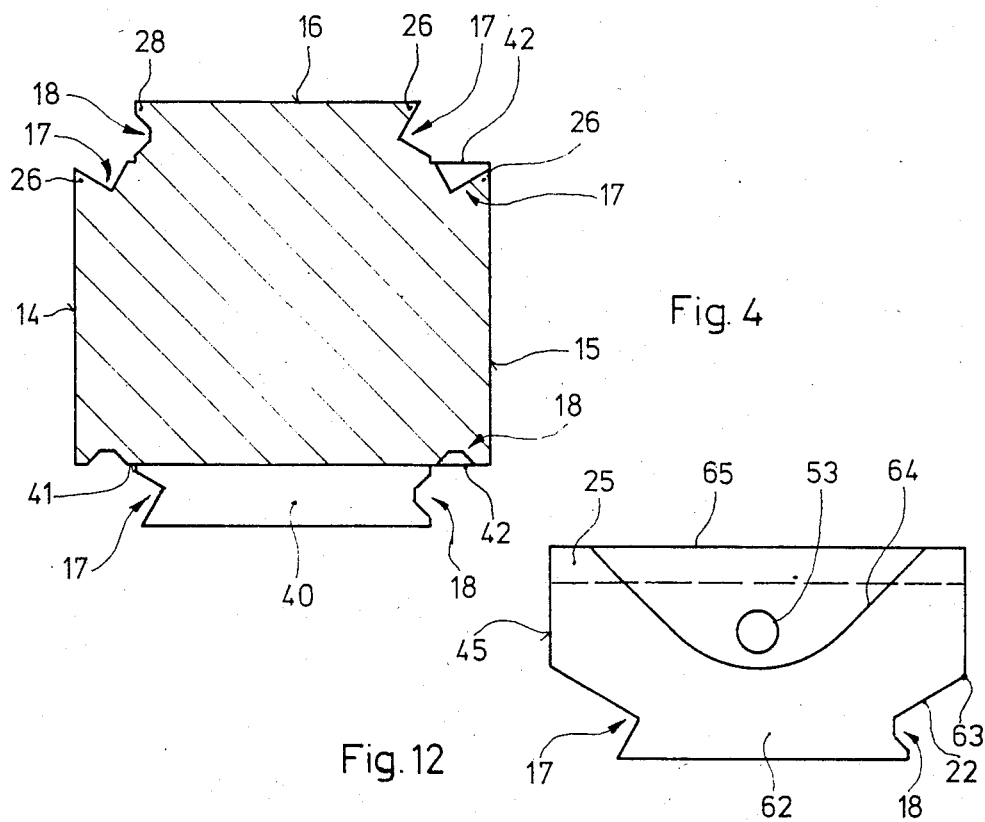
Fig. 4
Fig. 12

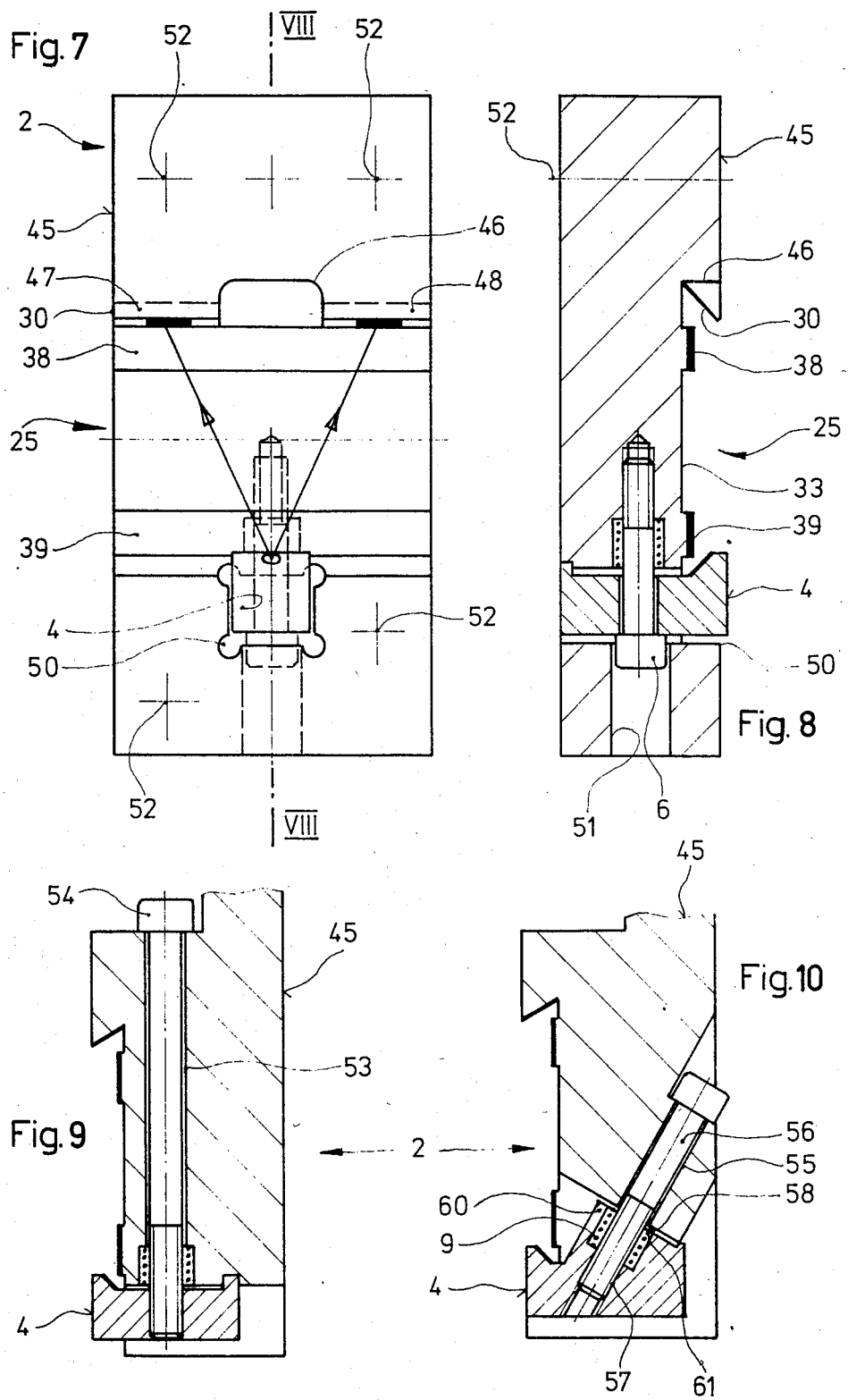

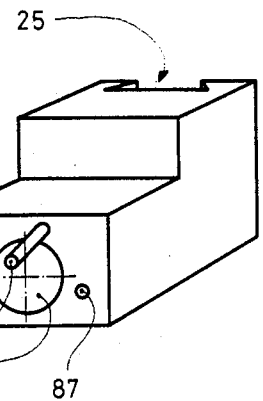
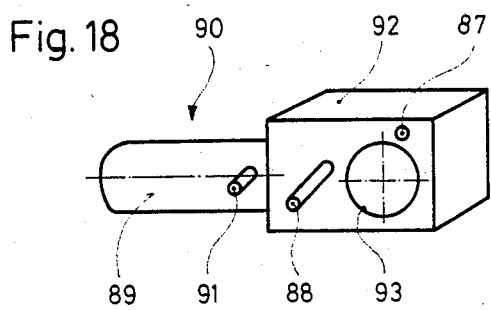
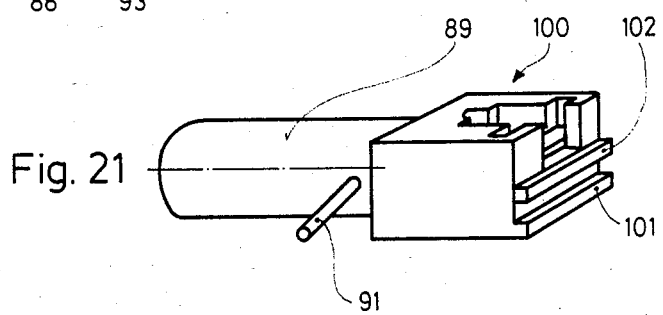
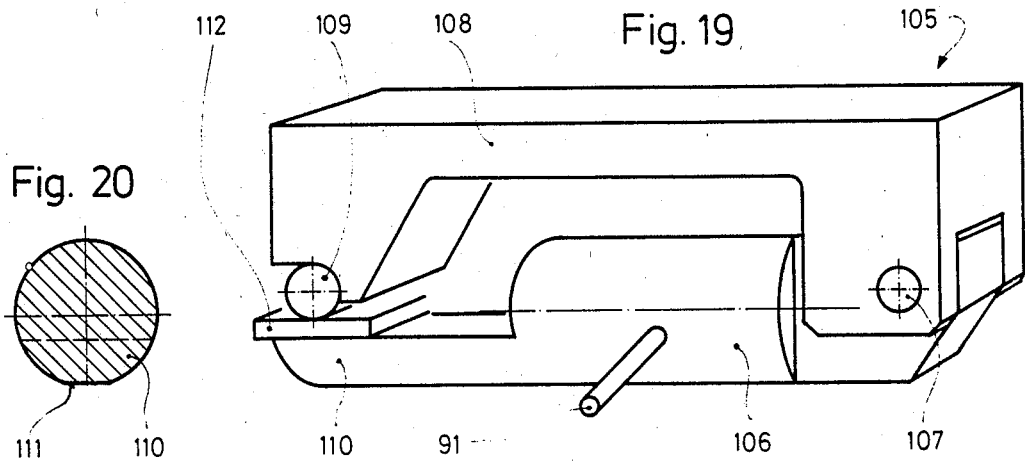

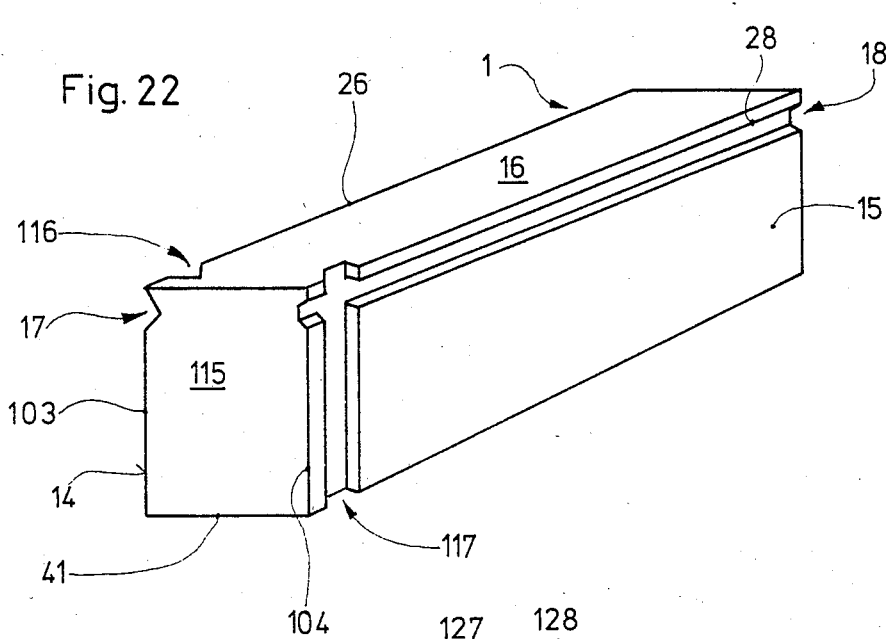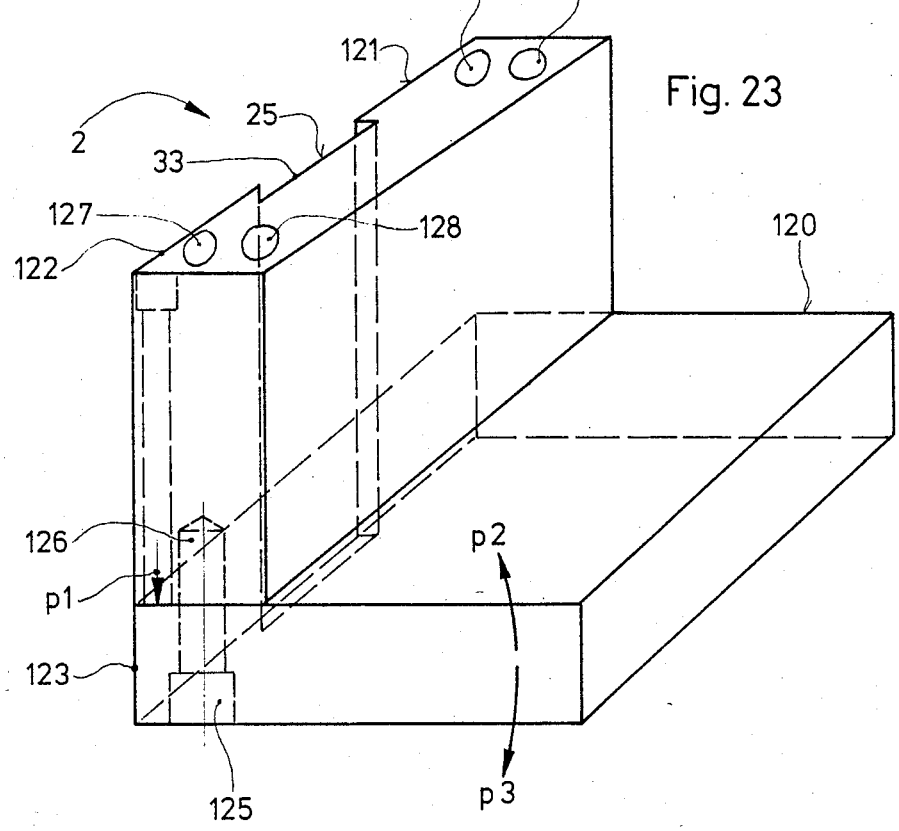

DEVICE FOR MOUNTING AN OBJECT

The invention relates to a device for mounting an object in a desired position in space, with a guiding piece and with a guided piece whilst the object may be attached to the guided piece.

Such a device is suitable particularly for positioning and for mounting a workpiece or a tool, especially in a spark erosion machine. However, this device may also be used in other types of machining of workpieces.

One of the reasons for the stoppage of a processing machine is that a machine is inactive when the operator is converting the machine in order that it can execute a different work operation or when another workpiece is still present in the processing region of the machine.

There are systems which permit the workpiece to be pre-adjusted on a frame holding it, namely in a specific spatial arrangement, and the workpiece with the frame to be positioned subsequently relative to the tool of the machine. Such systems enable the operator to make ready a carefully aligned workpiece whilst the machine is still processing another object. The holding frame with the workpiece is then brought rapidly and carefully into the processing position, in which the frame is correctly oriented relative to the tool of the machine. This considerably reduces the stoppage time of the machine.

A known arrangement of this type comprises a transverse beam with a plurality of bores which are executed at mutually equal intervals along the beam. Such an arrangement further comprises a guide means which is such that it can be locked on the beam by means of bolts which are inserted into the said bores in the beam. The guide means exhibits a surface on which a workholder is attached by means of bolts et cetera. The guide means is generally provided with at least one appropriate locking means. This means positions a workholder relative to the guide means. Clamps are provided which clamp the workholder on the guide means and the workpiece on the workholder. A grip or the like may serve as means for fastening the workpiece to the workholder, or else a plurality of holes which can receive fastening screws or fastening bolts.

Such arrangements are substantially satisfactory in operation. However, the alignment of the bores in the beam with those in the guide means can represent a time-wasting factor. Furthermore, in the previously known arrangement there is only a limited number of possible settings of the guide means relative to the beam. Those settings which lie between two adjacent orifices in the beam cannot be obtained in the case of the known arrangement.

A further disadvantage of the known device lies in the fact that the guided piece of the device can be inserted onto the guiding piece only at the end of the latter. It is then necessary to slide the guided piece along the guiding piece into the desired position on the guiding piece. Because the mutually contacting surfaces of the two pieces are machined with high precision, it is not easy to move the guided piece along the guiding piece for a long distance. In this case undulations may arise in the said surfaces, which make it impossible to maintain the position of the guided piece relative to the guiding piece, when once adjusted, during the processing operation.

The aim of the invention is to produce a device which is free from the said disadvantages.

This aim is achieved in the device of the type initially defined, when the marginal parts of two opposite lateral faces of the guiding piece, which adjoin a surface of the guiding piece common to them, are provided with channels, when the flanks of these channels form an angle other than 0° with the median plane A of the channels, and when the guided piece exhibits a recess to receive the thus profiled part of the guiding piece.

The guiding piece advantageously exhibits a substantially square or rectangular cross-section, whilst at least two opposite surfaces of the guiding piece are provided with substantially vee-shaped furrows or channels which are oriented parallel to the edge of the adjacent side or front side. The guiding piece may advantageously enter into engagement with a surface lying therebetween, if it is provided with suitable elements for cooperation with the vee-shaped channels. It is then only necessary to arrange in the said components means which force them apart and which clamp the opposite surfaces of the vee-shaped arrangements.

In an advantageous embodiment the guiding piece is particularly executed so that it can receive guided pieces on at least two of its surfaces which stand mutually at a right angle. In such a case a double furrow or double channel is executed in one of the edges of the guiding piece with a substantially rectangular cross-section. In this case, at a passage of the mechanical processing two inclined clamping surfaces are provided which cooperate with the said vee-shaped channel edges of the guided piece.

If the double channel is cut sufficiently deeply, the guiding piece can receive at least two guided pieces which are brought into coincidence on the said guide means and which facilitate the positioning of the workpiece.

If desired, the guiding piece may be executed so that it is oriented vertically. In such a case the guiding piece is provided in the region of its allotted base with a baseplate, which is provided with appropriate fastening means for connection to a machine table.

The guided piece may exhibit a channel or a recess, which are provided with oppositely arranged and contrarily divergent edges. These edges may cooperate with the vee-shaped parts of the guiding piece. The channel may be oriented in a first direction, whilst on another surface of the guided piece a rail or an elongate projection may be arranged at a right angle relative to the channel. The lateral walls of the projection are likewise provided with substantially vee-shaped channels which cooperate with the workholder.

The workholder advantageously exhibits a substantially L-shaped construction, whilst its rear side is provided with a suitable channel or with a recess of substantially trapezoidal cross-section. Either the surface or the remote edge surface of the L-shaped member may be provided with bores for fastening the workpiece.

To enable the orientation of shanks accommodated in the bore or in the workholder to be checked, and to enable them to be oriented accurately relative to the workholder, a sine bar rule is provided. This may be provided with a plate which is constructed to cooperate with the shank. This lower plate is connected by a hinge to a substantially L-shaped member, the end of which is provided with a contact means or with a roller. When the rule is applied, the relative movement of the lower plate causes a pivoting movement of the upper member.

A shank which is provided with a vise may be accommodated in the bore. The vise may be constructed for mounting comparatively small workpieces which require precise treatment.

Exemplary embodiments of the invention are explained more fully below with reference to the accompanying drawings, wherein:

FIG. 1 shows a vertical section through the present device, which exhibits a guiding piece and a guided piece, FIG. 2 shows a plan of the device illustrated in FIG. 1, FIG. 3. shows, in a vertical section, a further development of the guiding piece of the device according to FIG. 1, FIGS. 4 and 5 show further embodiments of the guiding piece, FIG. 6 shows in perspective the present device with vertically arranged guiding piece, FIG. 7 shows in plan the underside of the guided piece with a holding device, FIG. 8 shows in a longitudinal section VIII—VIII the guided piece with the holding device according to FIG. 7, FIGS. 9 and 10 show in a longitudinal section two further embodiments of the guided piece with a holding device, FIG. 11 shows in perspective the guided piece, which exhibits a projection with channels in addition to a recess, FIG. 12 shows in elevation the guided piece, which exhibits a narrow part, FIG. 13 shows the guided piece with a magnetic member, FIG. 14 shows in perspective a sliding table on the guided piece of the present device, FIGS. 15 to 17 show in perspective guided pieces which exhibit an L-shaped cross-section, FIG. 18 shows in perspective a guided piece with a shank and with a shank hole, FIG. 19 shows in perspective a sine bar rule which exhibits a shank which is insertable into the shank hole, FIG. 20 shows the section XX—XX from FIG. 19

FIG. 21 shows in perspective a vise which is provided with a shank,

FIG. 22 shows in perspective a further embodiment of the guiding piece according to FIGS. 1 and 6 and FIG. 23 shows in perspective a further embodiment of the guided piece according to the FIGS. 15 and 16.

Figure 1:
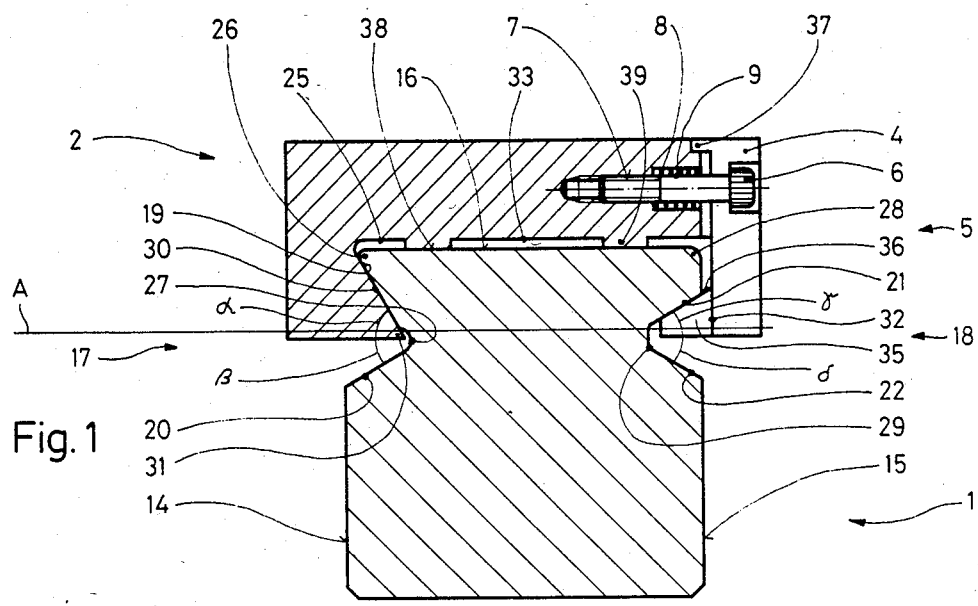
Figure 2:
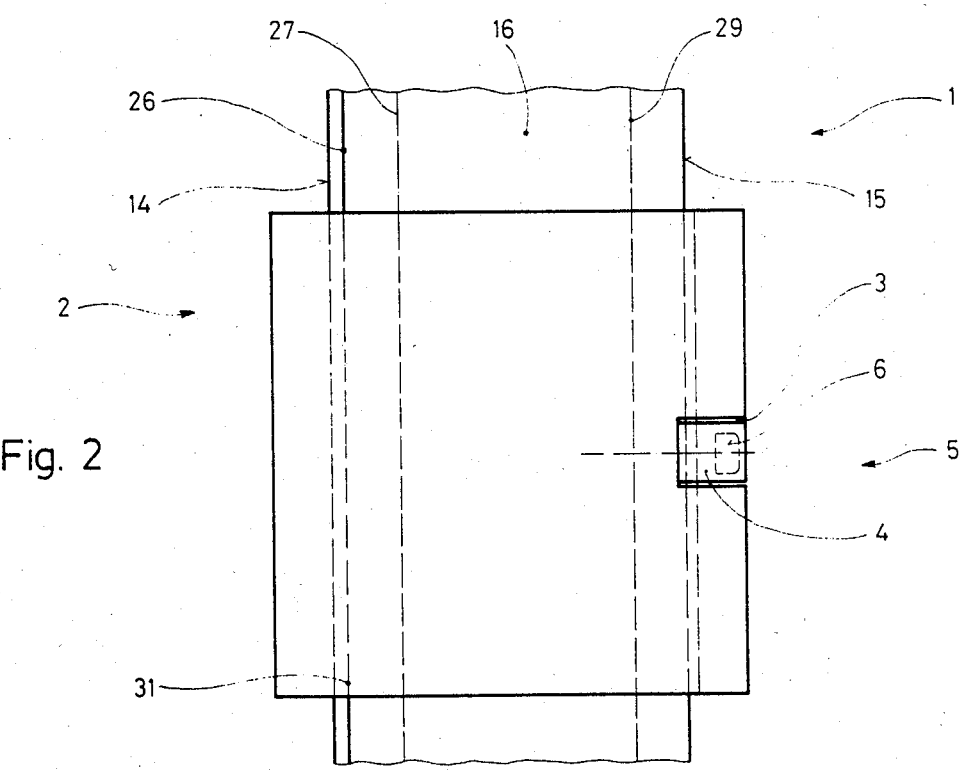

The device illustrated in FIGS. 1 and 2 exhibits a guiding piece 1 which is substantially bar-shaped, as may be seen from FIG. 2. A guided piece 2 of the present device is placed on this guiding piece 1. The guided piece 2 exhibits a cavity 3 (FIG. 2) in which the pawl 4 of a holding device 5 is located. The pawl 4 is retained in the cavity 3 by means of a screw 6, the screw 6 being engaged in a tapped bore 7 which is made in the guided piece 2. The outer section 8 of the bore 7 is constructed with an enlargement 8, in which a compression spring 9 is located. One end of this spring 9 is braced against the bottom of the enlargement 8, whereas the other end of the spring 9 presses against the pawl 4. When the screw 6 is slackened, the said spring 9 causes the pawl 4 to move out of the cavity 3, and also to remain in its outer limit position afterwards. This is very important for the placing of the guided piece 2 onto the guiding piece 1, as will be explained more fully below.

The guided piece 1 may be attached by legs 10 (FIG. 5) on the clamping table 11 of a machine tool or on a pre-adjusting table. Sometimes the beam 1 is fastened directly on said table 11 by means of screws, not shown but generally known. A workpiece (not shown) may be fastened directly or indirectly upon the guided piece 2, which is represented here as a holder 2, as will be described more fully below.

The marginal parts of two mutually opposite lateral surfaces 14 and 15 of the guiding beam 1, which adjoin one of the surfaces 16 of the beam 1, are provided with channels 17 and 18. The flanks 19 and 20, or 21 and 22, of these channels 17 and 18 form angles alpha, beta, gamma and delta, which are other than 0°, with the plane A longitudinally intersecting the channels 17 and 18. The guided piece 2 exhibits a recess 25 which is intended to receive the thus profiled part of the guiding piece 1.

The channels 17 and 18 are constructed differently in the example illustrated. The first flank 19, located nearer to the said surface 16 of the beam 1, of the left-hand channel 17 intersects the top side 16 of the beam 1, so that this corner part of the beam 1 exhibits a sharp edge 26. The angle alpha which this flank 19 forms with the plane A is for example 60°. The angle beta which the other flank 20 of the left-hand channel 17 forms with the plane A may be 30°. A clearance 27, the purpose of which will be explained later, is made in the bottom part of this channel 17 between the said two flanks 19 and 20.

In the case of the other channel 18, the flank 21 located nearer to the said surface 16 of the beam 1 terminates in this lateral surface 15 of the beam 1, and thus at an interval from said surface 16 of the beam 1. This corner part of the beam 1 therefore exhibits a blunt edge 28. The angles gamma and delta, which the flanks 21 and 22 of this channel 18 form with the plane A, may be 30°, or they exhibit another value between 15 and 60°. A flat bottom 29 is made between the flanks 21 and 22 of this second channel 18. This second channel 18 therefore exhibits a U-shaped profile with outwardly inclined members 21 and 22.

The recess 25, already mentioned, in the guided piece 2 is executed as a shallow groove, one of the lateral walls 30 of this groove 25 being undercut. This undercut wall 30 of the groove 25 is in engagement with the first flank 19 of the first channel 17. The sharp edge 31 of the guided piece 2, which is located at the free end of the undercut wall 30, lies in the clearance 27, so that this edge 31 cannot come into contact with the beam 1. The free space bounded by the clearance 27 also ensures that the sharp end 31 cannot contact the beam 1 even when the guided piece 2 is pivoted about this edge 31, as is described below.

One of the most important advantages of this device is that the guided piece 2 can be placed onto the guiding piece 1 from above at any point of the latter. It is therefore not necessary for the guided piece to be slid along the beam 1 for a long distance. For this purpose the second wall 32 of the groove 25 is oriented approximately at right angles to the bottom 33 of the groove 25, this second wall 32 even being located at an interval from the blunt edge 28 of the beam 1. Therefore the second wall 32 of the groove 25 is not in engagement with the second channel 18 of the beam 1. The engagement in the channel 18 is provided by the pawl 4 already discussed, which is arranged in this region of the guided piece 2.

The pawl 4 exhibits a nose 35 which lies in the second channel 18 of the beam 1, or can enter the latter when the screw 6 is tightened. The top side 36 of the nose 35 is inclined, whilst the angle which this top side 36 of the nose 35 forms with the plane A is equal in value to the angle gamma. Under these conditions, when the screw 6 is tightened, the top side 36 of the nose 3 comes to rest upon the upper flank 21 of the second channel 18. The tip of the nose 35 is flattened so that the nose 35 cannot touch the bottom 29 of the channel. A projection 37, which is made at the other end of the pawl 4, lies in a corresponding recess of the guided piece 2. This projection 37 serves to maintain a specific height of the pawl 4, particularly when the screw 6 is tightened, since then the pawl 4 is pressed downwards due to the nose 35 resting upon the upper flank 21.

When it is required to remove the guided piece 2 from the beam 1, the screw 6 is slackened. The pawl 4 then moves away from the beam 1 by the action of the compression spring 9. The top side 36 of the nose moves away from the upper flank 31 of the right-hand channel 18 until the nose 35 completely leaves this channel 18. That part of the guided piece 2 located on the right and exhibiting the pawl 4 can then be pivoted upwards, namely about an axis which lies in the region of the sharp edge 31 of the guided piece 2 and therefore also in the region of the clearance 27.

When placing onto the beam 1, the sharp edge 31 of the guided piece 2, and therefore also the undercut lateral wall 30 of the groove 25 in the guided piece 2, is first of all brought into engagement with the upper flank 19 on the left-hand channel 17 in the beam 1. Then the right-hand part of the guided piece 2 is moved downwards. The pawl 4 is maintained in its extreme limit position by virtue of the compression spring 9, so that the nose 35 of the pawl 4 is located at an interval from the blunt edge 28 of the beam 1 and cannot strike the surface 16 of the beam. The right-hand part of the piece 2 can therefore be placed onto the upper part of the beam 1 without obstruction. During the tightening of the screw 6, first of all the nose 35 enters the right-hand channel 18 of the beam 1, and only after this does the top side 36 of the latter come to rest upon the upper flank 21 of the right-hand channel 18. When the screw 6 is tightened sufficiently, the guided piece 2 then rests firmly upon the beam 1.

The bottom 33 of the groove 25 is provided with flat and wide projections 38 and 39 which are oriented in the sliding direction of the guided piece 2 and facilitate the sliding of the guided piece 2 on the beam 1 when it is required to correct the position of the piece 2 on the beam 1. The facilitation of the sliding of the piece 2 occurs because the contact surface between the two pieces 1 and 2 is given only by the size of the surface of the projections 38 and 39. Obviously, less dirt, which may impair the sliding of the said surfaces on each other, can accumulate between smaller surfaces.

FIG. 3 illustrates a guiding piece 1, on which a pair of the channels 17 and 18 is associated with each of the adjacent surfaces 14 and 16 of the beam 1. As may be seen from FIG. 3, the nature of the channels 17 in the corner part of the beam 1 common to the two said surfaces 14 and 16 is the same. In the example illustrated the channels 17 have the clearance 27 and form a double channel. The mutually facing flanks 20 of these channels 17 lie deeper in the beam 1 than the said surfaces 14 and 16 thereof. The remote flanks 19 of the two channels 17 form a sharp edge 26 with the respective surface 14 or 16 associated therewith. One of the channels 18 with the flat bottom 29 is made in the second lateral wall 15 of the beam 1, and the other of the channels 18 with the flat bottom 29 is made in the underside 41 of the beam 1.

At least one guided piece or holder 2 may be arranged, and fastened by means of the holding device 5, on each of the two thus profiled parts of the beam 1. Only one of the guided pieces 2, which is placed on the upper profiled part of the beam 1, is illustrated in FIG. 3. The guided piece is arranged on the lateral profiled part of the beam 1 so that its holding device 5 lies in the region of the lower channel 18. In fact the pawl 4 of this device 5 can engage only in that channel 18 which exhibits a flat bottom 29 and is therefore sufficiently wide to receive the nose 35 of the pawl 4. It is therefore possible to attach a plurality of workpieces to a beam 1 constructed in this manner, and they may for example stand at a right angle.

As FIG. 4 shows, a pair of the said channels 17 and 18 is also associated with the second lateral surface 15. The channel 17, which forms a sharp edge 26 with the second lateral surface 15, is located at the top. Channel 17 which forms a sharp edge 26 with the top surface 16 of the beam 1 is located on the right-hand side in the case according to FIG. 4, whereas the channel 18 which forms a blunt edge 28 with the top surface 16 of the beam 1 is located on the left-hand side in FIG. 4. In the case of the first lateral surface 14 of the beam 1, that channel 17 which forms a sharp edge 26 with the first lateral surface 14 is located opposite the channel 18.

One of the surfaces of the base element of the beam 1, namely the underside 41 of the beam 1 in FIG. 4, is provided with a flat attachment 40. The lateral surfaces of this attachment 40 are provided with the channels 17 and 18 already mentioned. Such an attachment may serve, for example, for fastening the beam to the clamping table 11 of a machine tool or for attaching a further guided piece 2 to the beam 1. The attachment 40 may be of equal width to the remaining part of the beam 1. This attachment 40 may also be shorter than the beam 1, in which case the attachment 40 may be constructed on the basic element of the beam 1 between its end parts.

The channels 17 and 18 need not extend along the total length of the beam 1. FIG. 4 shows that the attachment 42 of the beam 1 following the right-hand pair of channels 17 and 18 extends farther without being provided with the channels 17 and 18.

Figure 5:
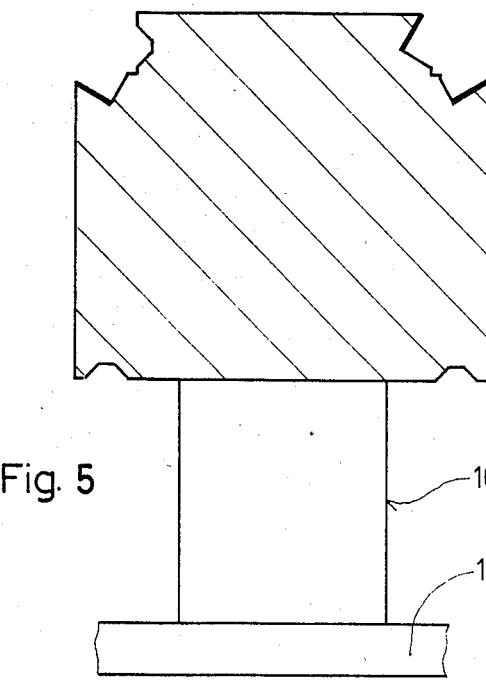

FIG. 5 illustrates a beam 1 with three profiled marginal parts, which have already been described in FIG. 4. This beam 1 is arranged horizontally and it rests upon the feet 10, which are fastened on the clamping table 11 of a machine tool or on a pre-adjusting station by means of screws, known per se.

Figure 6:
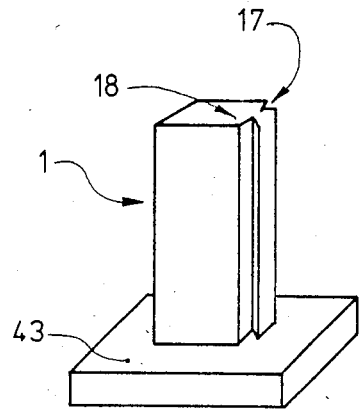

However, the bar-shaped or prismatic guiding piece 1 may also be arranged vertically, as illustrated in FIG. 6. The lower end of a guiding piece 1 so arranged is fastened on a baseplate 43. One or more guided pieces may be in engagement with that section of the guiding piece 1 exhibiting the channels 17 and 18. By means of such a device, the relevant guided piece can be brought to any desired height and locked there by means of the holding device.

FIG. 7 shows in elevation the underside of the guided piece 2, whilst FIG. 8 shows the section VIII—VIII through the embodiment of the guided piece 2 illustrated in FIG. 7. The groove 25 already mentioned is executed in the base element 45 of the piece 2, the projections 38 and 39 rising above the bottom 33 of the groove. The undercut lateral wall 30 of the groove 25 is located in its upper region. Approximately in the centre of the width of the guided piece 2, the undercut lateral wall 30 of the groove 25 is interrupted by means of an incision 46, so that it exhibits a left-hand section 47 and a right-hand section 48. These sections 47 and 48 of the undercut groove wall 25 are in engagement with that channel 17 of the guiding piece 1 which exhibits the clearance 27.

A square continuous aperture 50, in which the pawl 4 is housed, is made approximately in the centre of the width of the guided piece 2 in the region of the opposite lateral wall 32 of the groove 25. The pawl 4 can be pressed against the guiding piece by means of the screw 6 already mentioned. This screw 6 is accessible through an aperture 51 in the base element 45 of the guided piece 2. The opposite marginal parts of the base element 45 of the holder 2 are provided with tapped holes 52, so that the workpiece or other parts of the invention can be fastened to the guided piece 2.

The sections 47 and 48 of the undercut lateral wall 30 of the groove 25 form with the pawl 4 three points by which the guided piece 2 is fastened to the guiding piece 1. This three-point fastening, which is indicated by the corresponding arrows in FIG. 7, ensures a stable position of the guided piece 2 relative to the guiding piece 1.

In FIG. 9 the base element 45 of the guided piece 2 exhibits a continuous bore 53, through which a long screw 54 passes. The tip of this screw 54 is provided with a screwthread and it is screwed into the pawl 4 which exhibits a corresponding tapped hole.

The base element 45 of the guided piece 2 exhibits (FIG. 10) an obliquely oriented bore 55 in the region of the pawl 4, in which a screw 56 is located. This screw 56 is likewise screwed into the pawl 4, but it may be shorter than the screw 54 in the case of the base element 45 according to FIG. 9. The tapped bore 57 in the pawl 4 is likewise oriented obliquely, whilst one of the surfaces 58 of a roof-shaped projection 60 on the pawl 4 is oriented at right angles to the axis of this bore 57. The compression spring 9 already mentioned is located in an enlargement 61 made in this projection 60 of the pawl 4. This spring 9 abuts the bottom of the enlargement 61 on the one hand and the wall of the base element on the other hand. The consequence of this is that the pawl 4 is pressed away from the base element 45 by the spring 9.

In the embodiments of the present invention so far described, the base element 45 of the guided piece 2 was laminar, whilst its remaining walls were plane. However, the base element 45 may also have an articulated construction, which presents further possibilities for the combination of the components of the invention.

The guided piece 2 may also be provided, in addition to the groove 25, with channels 17 and 18 (FIG. 11) which were described above in connection with the beam 1. These channels 17 and 18 may either be oriented parallel to the groove 25 or at an angle thereto. In this case the groove 25 may be executed in one of the surfaces of the base element 45, whereas the channels 17 and 18 are executed in the wall of the base element 45 opposite thereto. The angle which the channels form with the groove is 90° in the example illustrated. The channels 17 and 18 are executed in the lateral walls of an attachment 62 of the base element 45, namely in the manner which was described in connection with FIG. 4.

The base element 45 may also be substantially wider than the attachment 62, as FIG. 12 shows. In order to bridge this difference in width, at least one of the flanks 22 of one of the channels 18 is prolonged so that it extends to the nearest lateral wall of the base element 45 and forms an edge 63 there. The base element 45 illustrated in FIG. 12 exhibits a depression 64 oriented in its longitudinal direction, which terminates before the region 65 of the base element 45 with the upwardly open groove 25 oriented at right-angles thereto. The aperture 53 to receive the screw 54 (FIG. 9) is executed below the groove 25.

Figure 13:
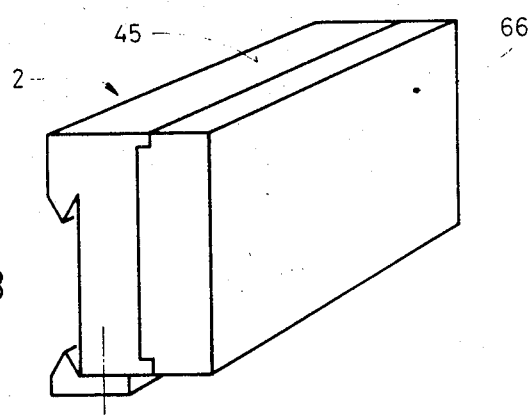

As may be seen from FIG. 13, a magnet 66 which can serve to receive the workpiece may be attached to the base element 45 of the guided piece 2. This magnet 66 may advantageously be a permanent magnet.

Figure 14:
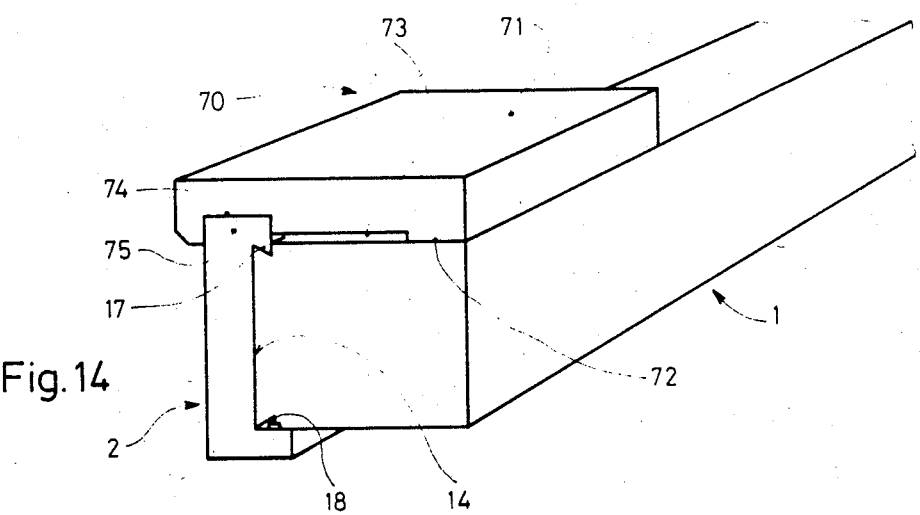

In another embodiment of the invention, which is illustrated in FIG. 14, a sliding table 70 is provided. The left-hand lateral part 14 of the beam 1 is provided with the channels 17 and 18, with which a guided piece 2 attached laterally to the beam 1 is in engagement. The table 70 exhibits a sliding upper part 71. The underside of the right-hand marginal portion of this upper part is provided with a support surface 72. A raised part 73 of the upper part 71 is located beside this support surface 72. A furrow 74 is present in the left-hand marginal portion of the upper part 71, being constructed so that the upper marginal portion 75 of the guided piece 2 can lie therein. The upper part 71 is therefore braced through the support surface 72 and the guided piece 2, and is furthermore fastened on the guided piece 2 by means of screws (not shown). The guided piece 2 is provided with a holding device 5 exhibiting the pawl 4, which are illustrated in FIGS. 7 to 10. Not only the work table 70, but also, for example, a workholder 2 can be arranged on the guiding piece 1 simultaneously.

Figure 15:
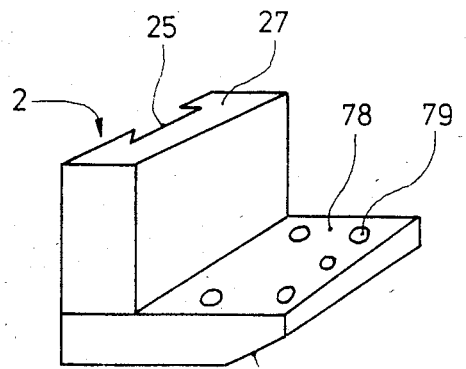

According to FIG. 15 the holder 2 exhibits substantially an L shape in longitudinal section. The rear side of the upwardly projecting member 77 of the holder 2 is provided with the substantially trapezoidal groove 25, the lateral walls 30 and 32 or 4 of which are in engagement with the channels 17 and 18 of a guiding piece. The laterally projecting part or member 78 of the holder 2 is provided with substantially vertically oriented holes 79 which are intended to receive bolts for fastening a workpiece or tool.

The underside of the workholder is provided with a chamfered front side or bevel 80, in order to reduce to a minimum any possibility of a collision with the remaining parts of the machine.

Figure 16:
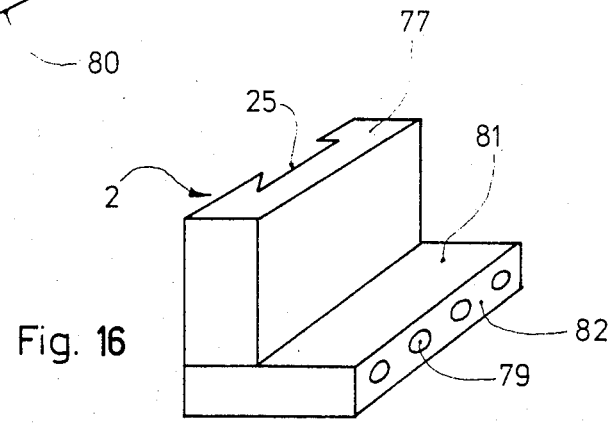

FIG. 16 likewise relates to an L-shaped holder 2 with the groove 25 and with a projecting part 81. A plurality of bores 79 are executed in that terminal face 82 of the projecting member 81 which is remote from the groove 25. These are likewise executed so that they can receive bolts which serve to fasten the workpiece on the workholder.

In the case of the holders 2 according to FIGS. 15 and 16 the vertical member 77 of the holder 2 is provided with the holding device 5 already described (FIG. 7 to 10) to enable the holder 2 to be retained in the prescribed position on the guide means.

The workholder 2 according to FIG. 17 likewise exhibits a substantially L-shaped configuration, and it is provided with a projecting and horizontally oriented shank flange 85. This flange 85 exhibits a comparatively great depth in order that a shank bore 86 and a plurality of bores 87 to receive bolts 88 can be executed therein.

The bolts 88 determine the position of a shank 89 which is arranged in the shank bore 86 and is attached to a further component 90 or 100 et cetera.

Figure 11:
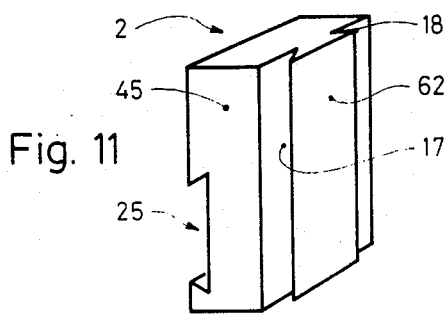

Arrangements according to FIGS. 6, 11 and 12, for example, may cooperate with the holders 2 according to FIGS. 15 to 17.

FIG. 18 illustrates the component 90, already mentioned, with the shank 89. The shank 89 is provided with a pin 91 standing out from it, which can be brought into abutment against one of the bolts 88 when the shank 89 is located in the shank bore 86 of the part according to FIG. 17. The rotational position of the shank 89 is determined by this means.

The outer end of the shank 89 is provided with a block 92, in which a shank bore 93 is likewise executed, which extends substantially at right angles to the axis of the shank 89 in this block 92. Locking means, for example the bolts 88, are fitted to the block 92 so that the position of the pin 91 on the shank 89 of a further component of this device can be limited. Circular workpieces can therefore be positioned axially or at right angles to the workholder 2 by means of the apparatus according to FIGS. 17 and 18.

According to FIG. 21, the shank 89 is executed so that it fits into the bore 86 or 93, and that its end is provided with a vise block 100 which exhibits a substantially rectangular shape. The top outer edge of the vise block 100 is provided with a substantially U-shaped furrow which ends in the block and forms the lower jaw 101 of a small clamp element. A movable element 102 is constructed so that it can move in opposite furrows which are arranged in the U-shaped furrow. It is intended to press the workpiece against the lower jaw 101.

By a rotation of the shank 89 in the shank bore 86 or 93, the workpiece held in the said vise 100 can be positioned in a suitable manner, namely axially and/or radially relative to the axis of the workholder 90 or 100. This is a function of whether the apparatus according to fig.17 or according to FIG. 18 is used.

A sine bar rule 105 is used to enable the angles of the shanks to be oriented accurately. It comprises a lower member 106, which is articulated through a joint with a pin 107 to an upper member 108. A roller 109 is located at the remote end of the upper member 108. When this roller 109 is placed upon an end measure 112 which is present on the lower member 106, the rotation about the central point of the pin 107 causes the upper member 108 to move laterally. The underside of the lower member 106 is provided in the region of its shank-shaped end 110 with a plane surface 111.

The guiding piece illustrated in FIG. 22 exhibits the channels 17 and 18 already described, which are associated with the top side 16 of this guiding piece 1. It has likewise already been described that the said channels 17 and 18 are executed in the lateral walls 14 and 15 of the guiding piece 1, namely parallel to its lateral edges 26 and 28. A pair of channels 111 and 112 is also associated with the end face 110 of the guiding piece 1, but they are oriented parallel to those edges 103 and 104 of the end face 110 which are common to this end face 110 and to the lateral walls 14 and 15. The two channels 111 and 112 are therefore likewise executed in the lateral surfaces 14 and 15, but they are oriented at an angle to the first pair of the channels 17 and 18, which is 90° in the example illustrated. The second channels could obviously also be executed in the top side 16 and in the bottom side 41 of the guiding piece 1.

Guided pieces 2 may be arranged on such a guiding piece so that they are in engagement either with the first pair of channels 17 and 18 or with the second pair of channels 111 and 112. Such a guiding piece may be arranged not only recumbent but also upright, as illustrated in FIG. 6.

According to FIG. 23 the guided piece 2, which is substantially L-shaped, exhibits two laminar parts 120 and 121, the first of these parts 120 being arranged recumbent. This first part 120 forms the horizontal member of the L shape, and on this the workpiece is fastened in one of the known manners. The second member 121 is set up on this lower member 120, whilst the recess 25 to receive one of the guiding pieces 1 is executed in the rear wall 122 of this second member 121. In case the rear wall 122 of the vertical member 121 is flush with the rear narrow wall 123 of the horizontal plate 120, the recess 25 must also be executed in the narrow wall 123. This can be avoided if the vertical member 121 is arranged offset to the rear relative to the narrow wall 123 of the first member 120 sufficiently for the bottom 33 of the recess 25 to lie behind the narrow wall 123.

Screws 125, only one of which is illustrated in FIG. 23, are introduced from below into the recumbent member 120. Advantageously, one screw 125 each is provided on the two sides of the recess 25. The tips 126 of these screws 125 are screwed into the lower part of the erect member 121, so that the two members 120 and 121 form an entity. To enable the mutual position of the two members 120 and 121 to be fine-adjusted to correspond to particular requirements, two screws each 127 and 128 are screwed into the erect member 121, namely so that the relevant screw 127 or 128 of the two said pairs of screws is located at a specific interval on each side of the corresponding lower screw 25. The apertures in the erect member 121, into which the screw 127 and 128 are screwed, are continuous, so that the tips of the upper screws 127 and 128 can project downwards out of the erect member 121.

The lower screws 125 draw the erect member 121 downwards, as is indicated by means of the arrow p3. When one of the upper screws 127 and 128 is tightened, the angle between the recumbent member 120 and the erect member 121 varies. When the first, that is to say the left-hand upper, screw 127 is tightened, the right-hand portion of the recumbent member 120 moves upwards in the direction of the arrow p2. The other, that is to say the upper, screw 128 located to the right of the lower screw 125, causes that portion of the recumbent member 120 located on the right to pivot downwards in the direction of the arrow p3.

By means of the above arrangement, a precise positioning of a workpiece for mechanical processing, particularly for processing by spark erosion, can be achieved, namely with a minimum of stoppage times and with a maximum of flexibility.

The contact surfaces between the guiding piece and the guided piece are constructed and dimensioned so that, after the guiding piece has been introduced into the guided piece, this structure cannot collapse under the influence of the deadweight of these parts, even if the pawl of the holding device has not been tightened.

The invention relates not only to the system itself, but also to sets of parts which comprise the essential elements of the arrangement. The invention further relates to spark erosion machines which comprise the arrangements for positioning workpieces according to this invention, and also to methods of mechanical processing of workpieces which comprise the positioning of the workpiece by means of the above-described arrangements.

I claim:

1. A device for mounting an object in a desired position in space, with a guiding piece and with a guided piece on which the object may be attached, wherein marginal parts of two opposite lateral faces of the guiding piece, which adjoin a surface of the guiding piece common to them, are provided with channels to form a profile, the flanks of these channels forming an angle other than 0° with the median plane A of the channels, the guided piece exhibits a recess with a bottom to receive the profiled part of the guiding piece and one of two lateral walls of said recess is undercut so that it can be brought into engagement with the first of the channels in the guiding piece; and wherein the other lateral wall is oriented approximately at right angles to the bottom of said recess and is provided with a holding device which can be in engagement with the second channel, located therebeneath, of the guiding piece.

2. A device as claimed in claim 1, wherein the holding device exhibits a cavity which is formed in a lateral part of the guided piece for accommodating a pawl so that a nose exhibited on the pawl lies in one of the channels of the guiding piece.

3. A device as claimed in claim 2, wherein the pawl is retained in the cavity by means of a screw and wherein the screw is engaged in a tapped bore which is made in the guided piece.

4. A device as claimed in claim 3, wherein the outer section of the bore is constructed with an enlargement in which a compression spring is braced against the bottom of the enlargement and the other end of the spring presses against the pawl.

5. A device as claimed in claim 2, wherein the tip of the nose is flattened and the top side of the nose is inclined so that said top side of the nose comes to rest upon the upper flank of the second channel in the guide piece whereby the tip of the nose cannot touch the bottom of said channel.

6. A device as claimed in claim 2, wherein the other end of the pawl is provided with a projection and wherein the opposite part of the cavity in the guided piece is provided with a recess in which said projection can take place.

7. A device as claimed in claim 1, wherein the bottom of the recess formed as a shallow groove is provided with projections oriented in the sliding direction of the guided piece and which rest on the surface of the guide piece which is between the channels.

8. A device as claimed in claim 1, wherein the flank of at least one of the channels which lies closer to the said surface of the guiding piece terminates at the said surface, so that this corner part of the guiding piece exhibits a sharp edge.

9. A device as claimed in claim 1, wherein that flank of at least one of the channels which lies closer to the said surface of the guiding piece terminates at the said surface, so that this corner part of the guiding piece exhibits a blunt edge.

10. A device as claimed in claim 8, wherein the bottom part of the second channel exhibits a flat section extending between the flanks, so that the channel exhibits a U-shaped profile with outwardly inclined members or lateral walls.

11. A device as claimed in claim 9, wherein the bottom part of the second channel exhibits a flat section extending between the flanks, so that the channel exhibits a U-shaped profile with outwardly inclined members or lateral walls.

12. A device as claimed in claim 1, wherein the bottom part of the first channel exhibits a clearance and wherein the sharp edge of the guided piece, which is located at the free end of the undercut wall, lies in said clearance.

13. A device as claimed in claim 1, wherein the other lateral wall of the recess, which is oriented approximately at right angles to the recess bottom, is located at an interval from the blunt edge of the guide piece.

14. A device as claimed in claim 9, wherein the other lateral wall of the recess, which is oriented approximately at right angles to the recess bottom, is located at an interval from the blunt edge of the guide piece.

15. A device as claimed in claim 1, wherein the guiding piece in the form of a prism and wherein pairs of the channels are associated with at least two surfaces of said guiding piece.

16. A device as claimed in claim 15, wherein the nature of the channels in the corner part of the guiding piece common to two neighboring surfaces is the same.

17. A device as claimed in claim 15, wherein one of the surfaces of the guiding piece is provided with a flat attachment, the lateral surfaces of which are provided with the channels.

18. A device as claimed in claim 1, wherein the undercut lateral wall of the groove is interrupted by means of an incision so that it exhibits a left-hand section and a right-hand section being in engagement with the first channel of the guiding piece.

19. A device as claimed in claim 2, wherein said cavity is executed as a square continuous aperture in which the pawl is housed whereby said aperture can be placed approximately in the center of the width of the guided piece and wherein the screw is accessible through another aperture formed in the base element of the guided piece.

20. A device as claimed in claim 2, wherein the base element of the guided piece exhibits a continuous bore through which the screw passes and wherein the tip of this screw is screwed into the pawl.

21. A device as claimed in claim 2, wherein the base element of the guided piece exhibits an obliquely oriented bore in the region of the pawl, in which the screw is located, and wherein the tapped bore in the pawl is likewise oriented obliquely while one of the surfaces of a roof-shaped projection on the pawl is oriented at right angles to the axis of this bore.

22. A device as claimed in claim 1, wherein marginal parts of two opposite lateral faces of the guided piece, which adjoin a surface of the base element of the guided piece common to them are provided with channels.

23. A device as claimed in claim 1, wherein the angle which said channels form with the recess in the base element is 90°.

* * * * *